United States Patent
Chen et al.

(10) Patent No.: US 7,121,823 B2
(45) Date of Patent: Oct. 17, 2006

(54) MOLD ASSEMBLY FOR FORMING A PLASTIC ARTICLE HAVING A COMPLICATED SHAPE

(75) Inventors: Chihyu Chen, Tucheng (TW); Lobo Wang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 252 days.

(21) Appl. No.: 10/923,663

(22) Filed: Aug. 24, 2004

(65) Prior Publication Data

US 2006/0045933 A1    Mar. 2, 2006

(51) Int. Cl.
B29C 33/44 (2006.01)
B29C 45/44 (2006.01)
(52) U.S. Cl. .................. 425/438; 425/441
(58) Field of Classification Search .......... 425/438, 425/441, 450.1, 451.3, DIG. 5, DIG. 58
See application file for complete search history.

(56) References Cited

U.S. PATENT DOCUMENTS 3,849,053 A * 11/1974 Bruce et al. .......... 425/438
4,768,747 A * 9/1988 Williams et al. ........ 249/63
4,958,676 A * 9/1990 Kuntz .................. 164/340
5,135,700 A * 8/1992 Williams et al. ........ 264/318
5,490,966 A * 2/1996 Peterson et al. ........ 264/318
5,635,126 A * 6/1997 Nomura et al. ......... 264/334
5,672,365 A * 9/1997 Ishii et al. ............. 425/127

\* cited by examiner

*Primary Examiner*—Joseph S. Del Sole
*Assistant Examiner*—Emmanuel S. Luk
(74) *Attorney, Agent, or Firm*—Rosenberg, Klein & Lee

(57) ABSTRACT

A Mold assembly for forming a plastic article includes a fixed plate, a female mold, a male mold, a first sliding mechanism, a second sliding mechanism, a following block, a threaded pole, and a shaft. The male mold defines a slot. The first sliding mechanism includes a first slider received in the slot and a first inclined pin secured to the fixed plate. The second sliding mechanism includes a second slider received in the slot and a second inclined pin secured to the female mold. A molding cavity is formed in the second slider. The following block for withstanding the second slider is fixed to the female mold. The threaded pole is inserted into the molding cavity for forming an internal thread of the plastic article. An end of the shaft is connected to a driver and the other end is connected to the threaded pole to bring it rotation. While opening the mold assembly, firstly, the first inclined pin pushes the first slider sliding rearward to allow the threaded pole unscrewed. Then the second inclined pin pushes the second slider sliding rearward to make the second slider break away from the molded plastic article. Thereby it facilitates taking out the molded plastic article from the mold assembly.

2 Claims, 10 Drawing Sheets

MOLD ASSEMBLY FOR FORMING A PLASTIC ARTICLE HAVING A COMPLICATED SHAPE

FIELD OF THE INVENTION

The present invention generally relates to a mold assembly for forming a plastic article with complicated shape, and more particularly to a mold assembly for forming a plastic article with complicated shape and internal thread.

BACKGROUND OF THE INVENTION

An injection mold assembly for forming internally threaded molded articles usually include a female mold which surrounds an externally threaded mold core. A mold cavity is defined between the female mold and the threaded mold core into which molten plastic is injected to form the molded article.

While the molten plastic is being injected into the mold cavity, coolant is circulated through cooling channels in the injection mold assembly to cool rapidly the molded article. Once the molded article is cooled, the injection mold assembly is conditioned to a mold open condition. During transition of the injection mold assembly from a mold closed condition to a mold open condition, the female mold and the mold core are moved relative to one another to allow the molded article to be ejected from the injection mold assembly. For the reason that the internal thread of the molded article is engaged with the threaded mold core, some parts of the mold assembly are desired to be rotatable to unscrew the internally threaded molded article.

U.S. Pat. No. 5,776,521, issued on Jul. 7, 1998, discloses a traditional mold assembly for forming threaded molded article which comprises a stationary mold core with an external threaded surface and a female mold surrounding a portion of the mold core including the threaded surface in a mold closed condition to define a mold cavity between the mold core and the female mold into which molten plastic is injected to form the molded article. A rotatable sleeve surrounds the mold core and engages with the molded article formed in the mold cavity. The sleeve carries a gear wheel which meshes with a pinion. A rack is associated with the pinion and is movable linearly to impart rotation of the pinion and in turn the sleeve. A lead screw on the sleeve engages a lead screw nut to cause the sleeve to displace axially along the mold core as the sleeve rotates. Lugs on the sleeve engage the molded article and causes it to rotate with the sleeve so that the molded article unscrews from the mold core.

As described above, because the traditional mold assembly has lugs engage the molded article, surfaces of the molded article engaged with the lugs may have flaws or even be damaged. Moreover, rotation-driving means of this mold assembly comprises a sleeve, a pinion, a rack, a lead screw, a lead screw nut, etc., such design is complicated in construct and expensive in cost.

Besides, the traditional mold assembly only adapts to forming articles whose threaded holes extend in the same direction of the mold opening. When an article has a complicated shape that its threaded hole cannot be arranged in the direction of the mold opening, as shown in FIG. 7 (the mold opening direction A is perpendicular to the article's threaded hole extending direction B), the prior art will be helpless.

SUMMARY OF THE INVENTION

An object of the present invention is to provide a mold assembly for forming a plastic article having complicated shape with internal thread and the plastic article can be ejected from the mold assembly easily.

A mold assembly for forming a plastic article having a complicated shape comprises:

- a fixed plate;
- a female mold placed under the fixed plate, the female mold defining a second hole therethrough;
- a male mold placed under the female mold, the male mold defining a slot in a top surface thereof;
- a first sliding mechanism comprising a first slider and a first inclined pin, wherein the first slider is slidingly received in said slot and has a sleeve extending from one side thereof and an inclined leading aperture therethrough, a first shaft hole being provided through the first slider to be in communication with the sleeve, and wherein the first inclined pin is secured to said fixed plate and passes through the second hole and the inclined leading aperture, the first inclined pin being bent at a proper location to cooperates with said inclined leading aperture to push the first slider sliding along said slot;
- a second sliding mechanism comprising a second slider and a second inclined pin, wherein the second slider is slidingly received in the slot and has a trapezoid hole and a second shaft hole which is coaxial with the first shaft hole, the second slider being provided with an inclined surface at on one side thereof and a mold cavity in the other side thereof, the mold cavity being in communication with the second shaft hole, and wherein the second inclined pin is secured to the female mold and passes through the trapezoid hole, the second inclined pin being bent at a proper location to cooperates with the trapezoid hole to push the second slider sliding along said slot;
- a following block fixed to the female mold, the following blocking defining a receiving groove therein which is exposed to a bottom surface of the following block so as to receive the sleeve while closing the mold assembly, the following block providing an inclined stopper corresponding to the inclined surface of the second slider, in the mold assembly closing state, the inclined stopper of the following block withstanding the second slider, while opening the mold assembly, the following block being moved upward and the inclined stopper providing a space for the second slider sliding backward;
- a threaded pole having an external thread at one end and a flange at the other end, a receiving hole defined in the threaded pole extending along an axis of the threaded pole; and
- a shaft, one end of which is a transmitting part, and the other end of which connects external driving means, the shaft passing through the first shaft hole and the sleeve, and received in the second shaft hole, the transmitting part of the shaft being received in the receiving hole so as to drive the threaded pole rotating, in the mold assembly closing state, the external thread of the threaded pole extending into the mold cavity to form a plastic article molding cavity, and the sleeve of the first slider withstanding the flange of the threaded pole, while opening the mold assembly, the first slider being moved backward to provide a space between the sleeve and the flange for the threaded pole unscrewing from the molded article.

The mold assembly comprises a first sliding mechanism which helps the threaded pole unscrew from the molded article sideward and a second sliding mechanism which helps the molded article depart from the second slider sideward, so the plastic article with complicated shape and internal thread can be formed and ejected from the mold assembly easily. In addition, the mold assembly is simple in structure and cheap in cost.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE INVENTION

Figure 1:
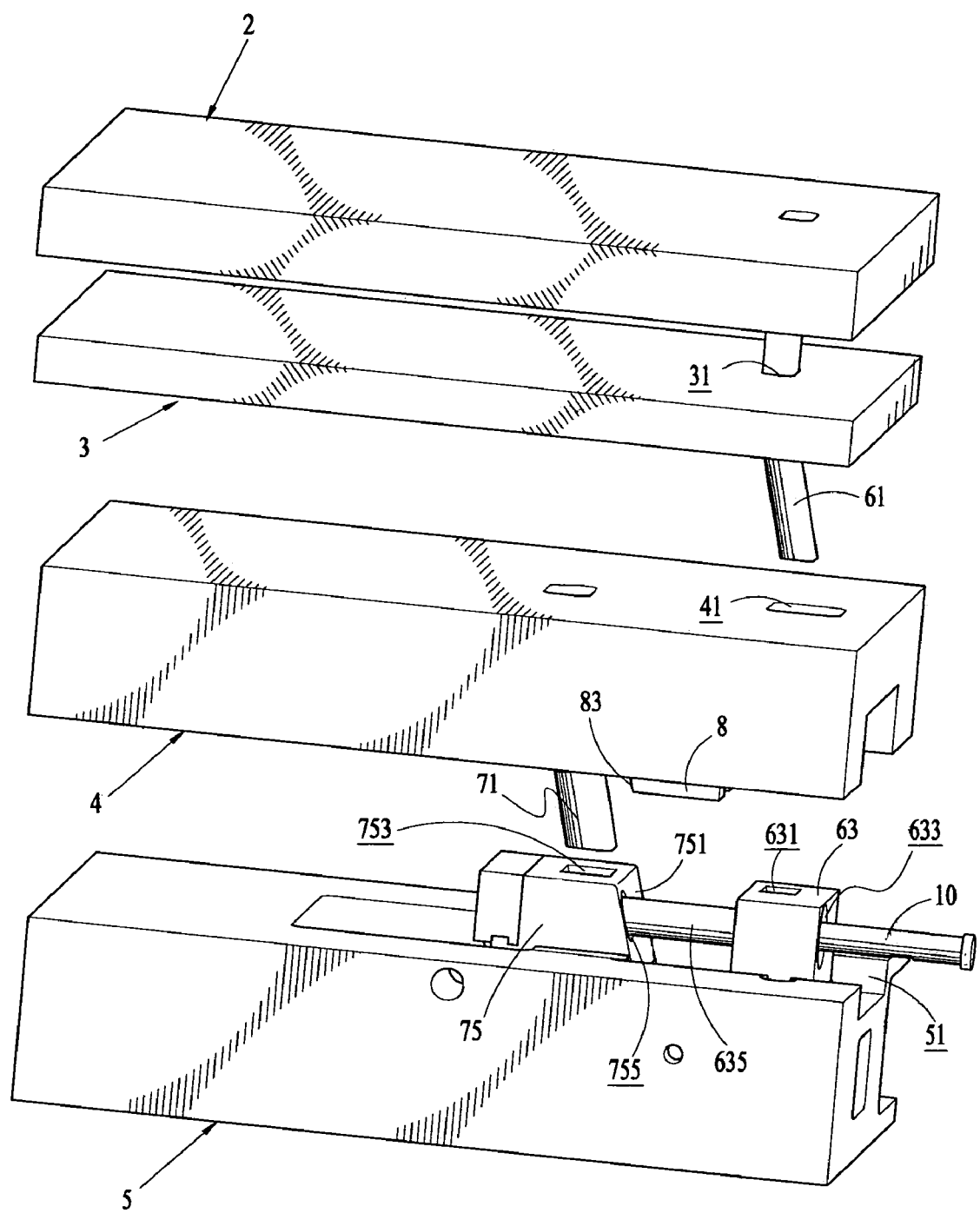
FIG. 1 is an exploded view of a preferred embodiment of the present invention.
Figure 2:
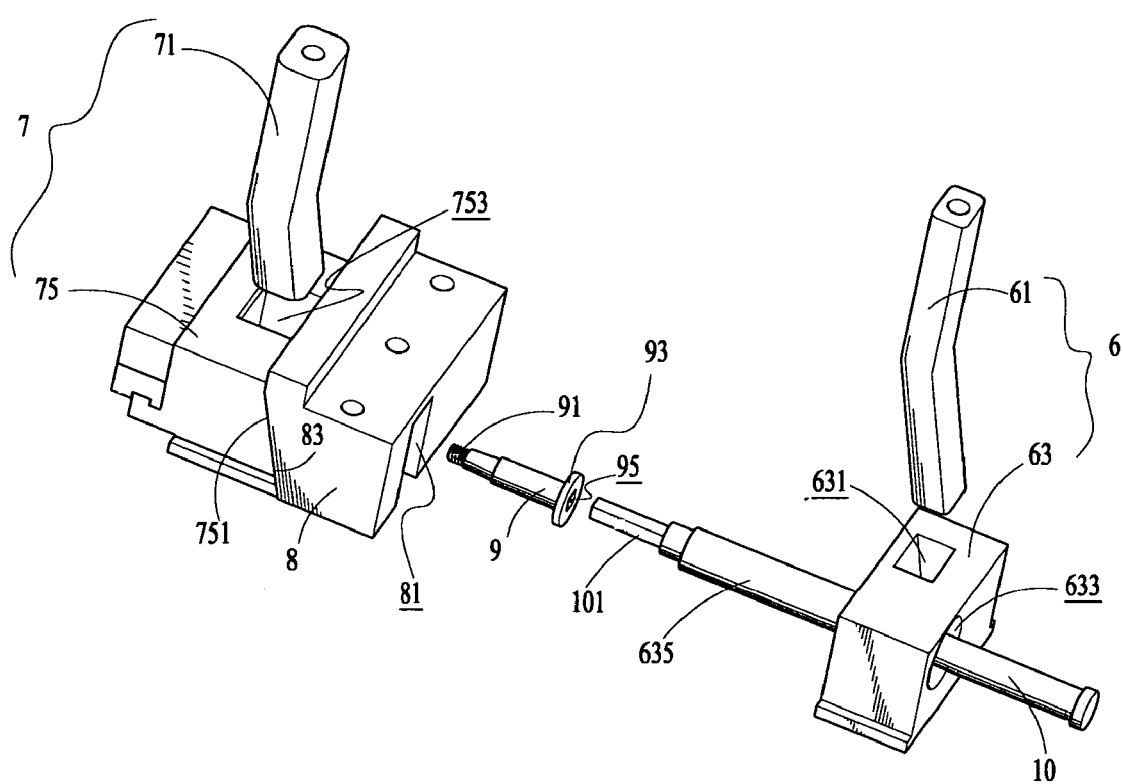
FIG. 2 shows the main components of the preferred embodiment of the present invention.

Referring to FIG. 1 and FIG. 2, which show a preferred embodiment of a mold assembly for forming a plastic article having a complicated shape according to the present invention. The mold assembly comprises a fixed plate 2, a stripping plate 3, a female mold 4, a male mold 5, a first sliding mechanism 6, a second sliding mechanism 7, a following block 8, a threaded pole 9, and a shaft 10.

The stripping plate 3 is placed under the fixed plate 2 used for stripping off redundant plastic. The stripping plate 3 defines a first hole 31 therethrough.

The female mold 4 is placed under the stripping plate 3. A second hole 41 is defined in the female mold 4.

The male mold 5 is arranged under the female mold 4, which defines a slot 51 in a top surface thereof.

The first sliding mechanism 6 comprises a first slider 63 and a first inclined pin 61. The first slider 63 is slidingly fitted into the slot 51 so that the first slider 63 can properly be moved linearly. A sleeve 635 is formed on one side of the first slider 63 and extends horizontally. A first shaft hole 633 is provided through the first slider 63 to be in communication with the sleeve 635 and sharing a same axis with the sleeve 635. An inclined leading aperture 631 is defined extending downwardly through the first slider 63. The first inclined pin 61 is secured to the fixed plate 2 and passes through the first hole 31 and the second hole 41 and the inclined leading aperture 631. The first inclined pin 61 is arranged with a bend at a proper location so as to cooperate with the inclined leading aperture 631 to push the first slider 63 sliding along the slot 51.

The second sliding mechanism 7 disposed in front of the first sliding mechanism 6 comprises a second slider 75 and a second inclined pin 71. The second slider 75 is slidingly fitted into the slot 51 so that the second slider 75 can be properly moved linearly. The second slider 75 has a trapezoid hole 753 extending downwardly therethrough and a second shaft hole 755 extending horizontally therethrough. The second shaft hole 755 iis coaxial with the first shaft hole 633 so that the sleeve 635 can be received in the second shaft hole 755. The second slider 75 is provided with an inclined surface 751 at one side thereof and a mold cavity 757 defined in the other side thereof (referring to FIG. 3A, FIG. 3B). The mold cavity 757 joins the second shaft hole 755. The second inclined pin 71 is secured to the female mold 4 and extends into the trapezoid hole 753. The second inclined pin 71 is arranged with a bend at a proper location so as to cooperate with the trapezoid hole 753 to push the second slider 75 sliding along the slot 51.

The following block 8 is fixed to the female mold 4. A receiving groove 81 is disposed in the following block 8 and exposed to a bottom surface of the following block 8 so as to receive the sleeve 635 while closing the mold assembly. Corresponding to the inclined surface 751 of the second slider 75, the following block 8 is provided with an inclined stopper 83 at one side thereof. In the mold assembly closing state, the inclined stopper 83 of the following block 8 withstands the second slider 75. While opening the mold assembly, the following block 8 is moved upward, and the inclined stopper 83 provides a space for the second slider 75 sliding backward.

The threaded pole 9 has external thread 91 at one end and provides a flange 93 at the other end. A receiving hole 95 is defined in the threaded pole 9 extending along an axis of the threaded pole 9. In the present embodiment, the cross section of the receiving hole 95 is square, besides, the cross section of the receiving hole 95 may also be defined as triangle, hexagon and so on.

One end of the shaft 10 is a transmitting part 101. The other end of the shaft 10 connects external driving means (not shown). The shaft 10 passes through the first shaft hole 633 and the sleeve 635, and is received in the second shaft hole 755. The transmitting part 101 of the shaft 10 is received in the receiving hole 95. The cross section of the transmitting part 101 is shaped to cooperate with the receiving hole 95 to drive the threaded pole 9 rotating. In the mold assembly closing state, the external thread 91 of the threaded pole 9 extends into the mold cavity 757 to form a plastic article molding cavity, and the sleeve 635 of the first slider 63 withstands the flange 93 of the threaded pole 9. While opening the mold assembly, the first slider 63 is moved backward to provide a space between the sleeve 635 and the flange 93 for the threaded pole 9 unscrewing from the molded article.

Figure 3A:
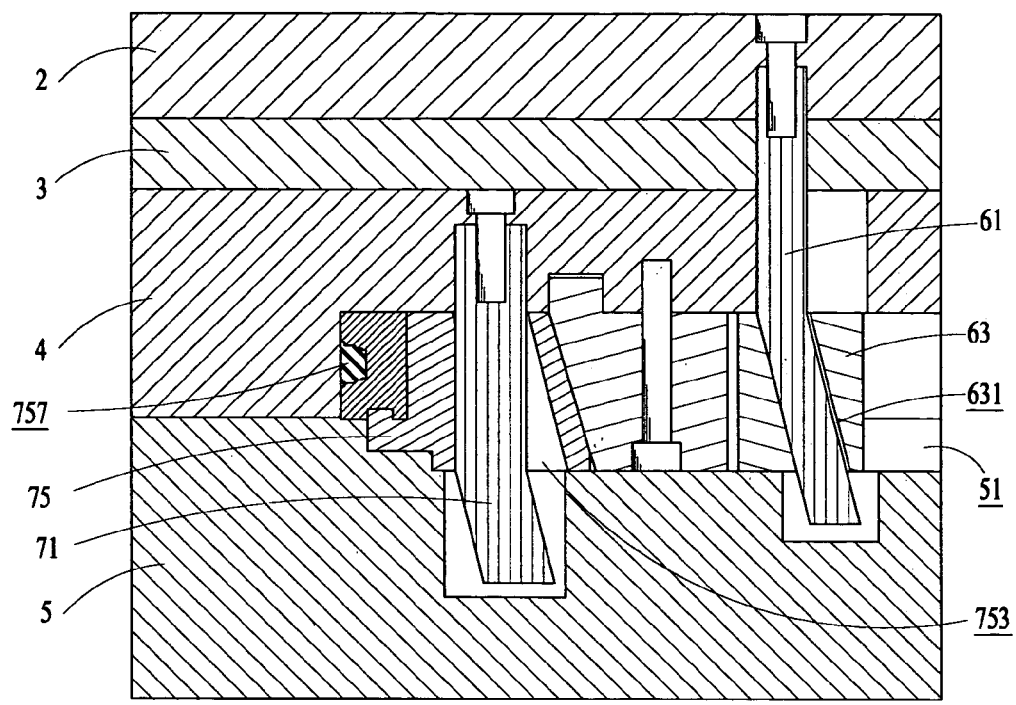
FIGS. 3A and 3B are sectional views of the preferred embodiment of the present invention which shows a mold assembly in a mold assembly closing state.
Figure 3B:
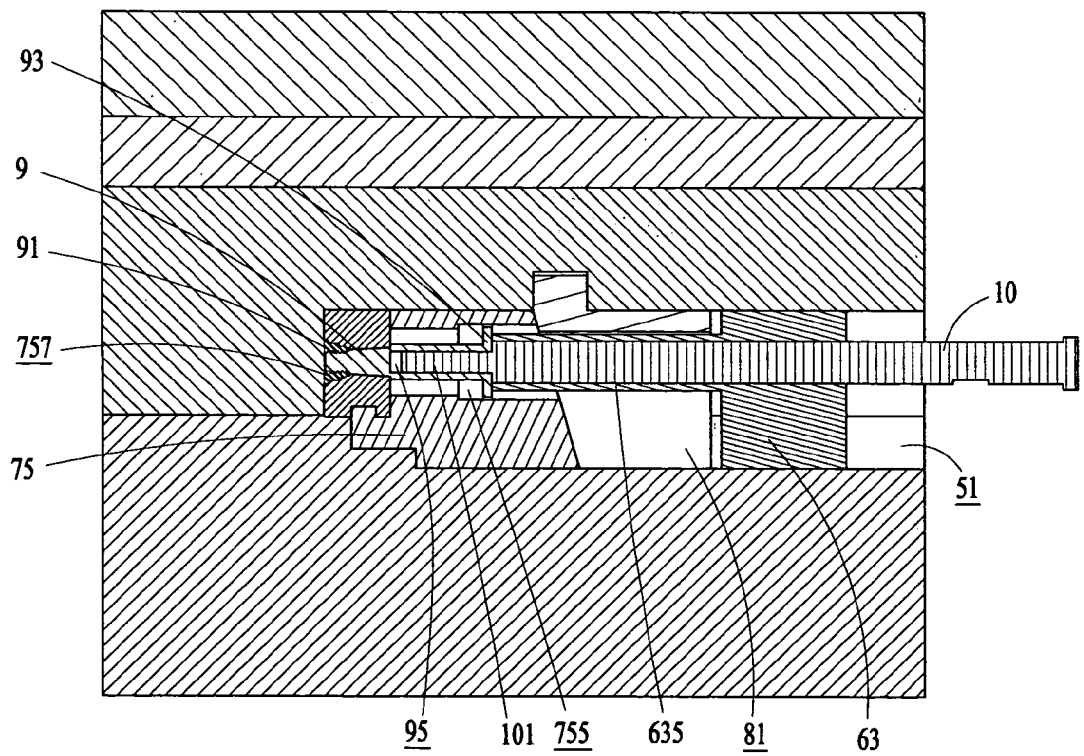

Please refer to FIGS. 3A and 3B, in the mold assembly closing state, the fixed plate 2, the stripping plate 3, the female mold 4 and the male mold 5 are closed together, and the mold cavity 757 is closed therein. The first inclined pin 61 is pressed passing through the inclined leading aperture 631 to position the first slider 63. The sleeve 635 abuts against the flange 93 of the threaded pole 9, and the external thread 91 is placed within the mold cavity 757 to define a cavity for the molten plastic injected into.

Figure 4A:
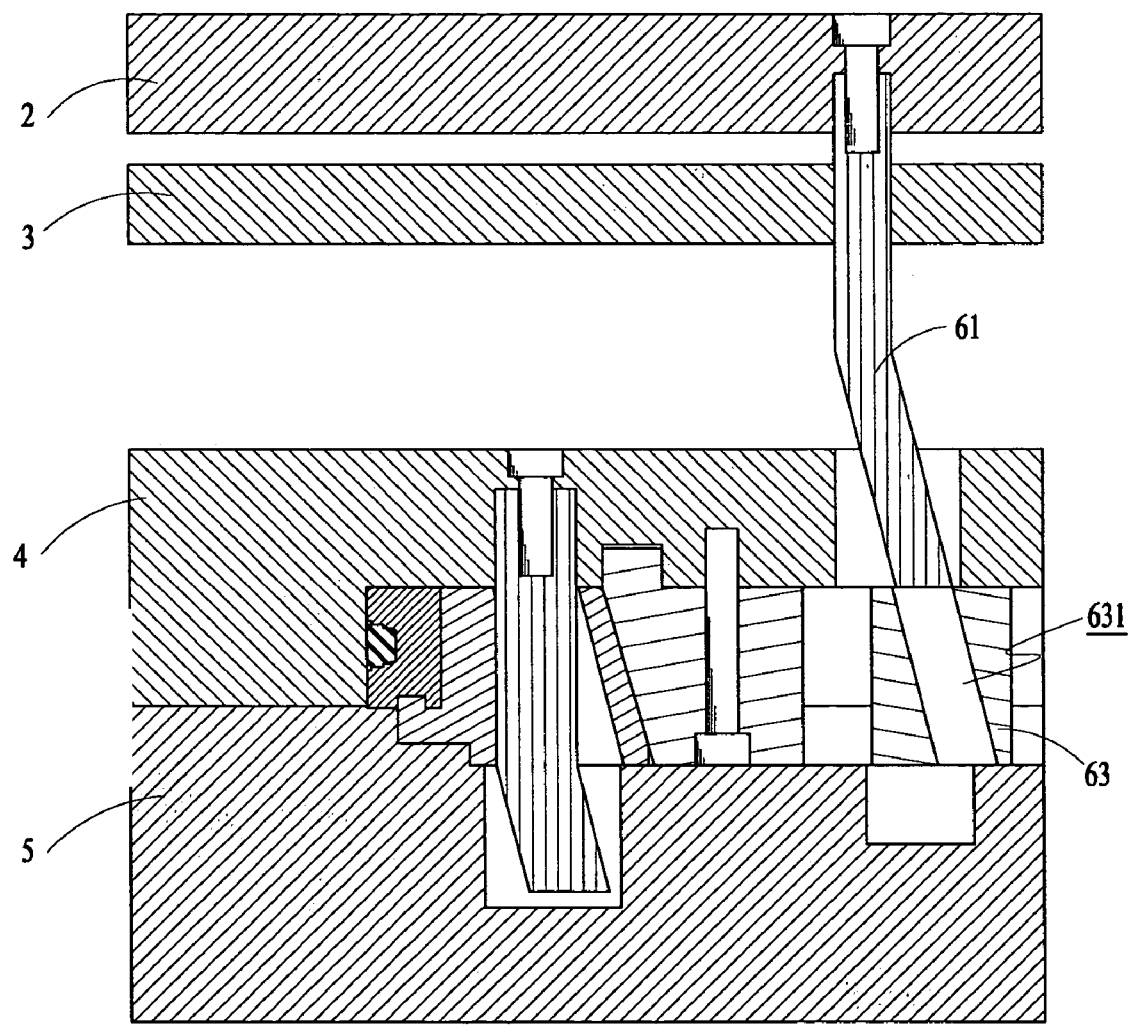
FIGS. 4A and 4B are sectional views of the preferred embodiment of the present invention which shows the mold assembly in an initial opening state.
Figure 4B:
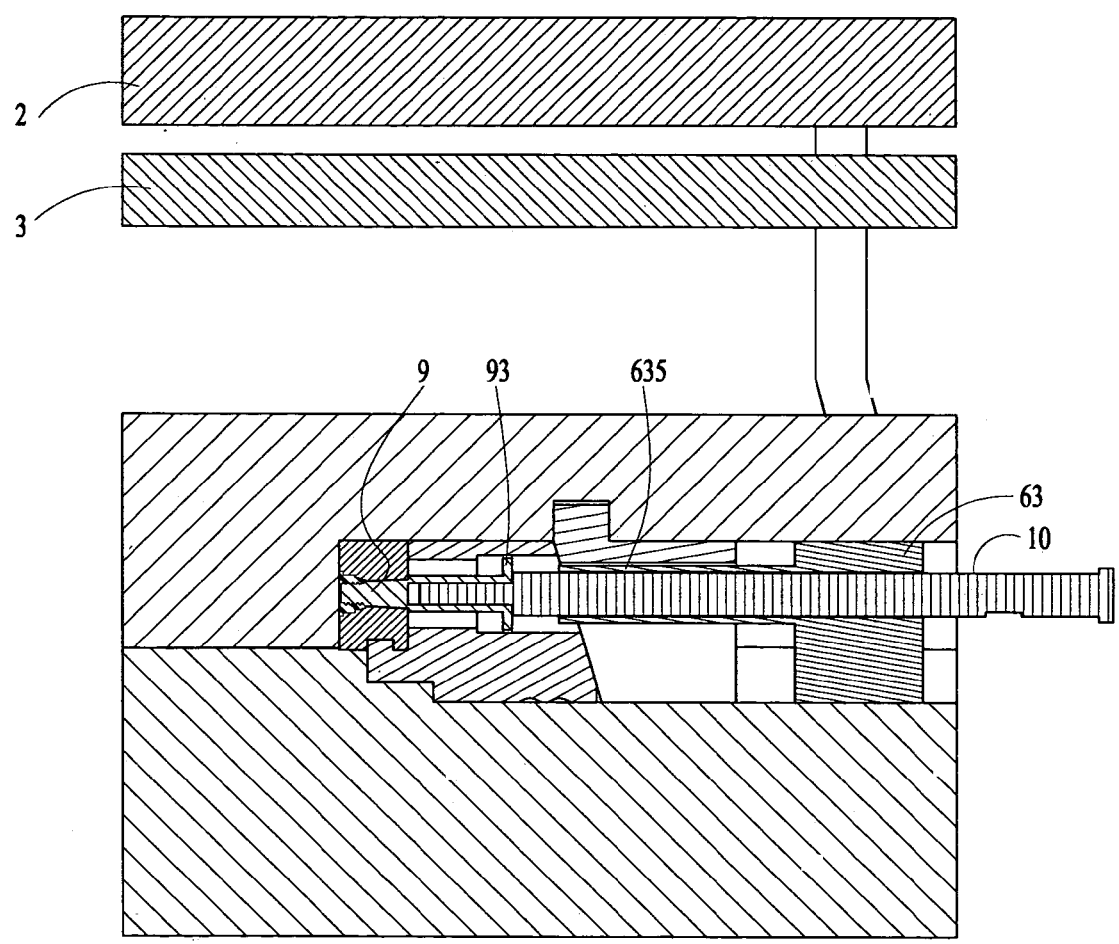

Please refer to FIG. 4A and FIG. 4B, which show that the mold assembly begins to open after the plastic molded article was cooled. When the female mold 4 and the male mold 5 are moved downward together, the first inclined pin 61 pushes the first slider 63 sliding backward, and the sleeve 635 of the first slider 63 departs from the flange 93 of the threaded pole 9, thus a space is provided between the flange 93 and the sleeve 635 for the threaded pole 9 and the shaft 10 unscrewing from the molded article.

Figure 5A:
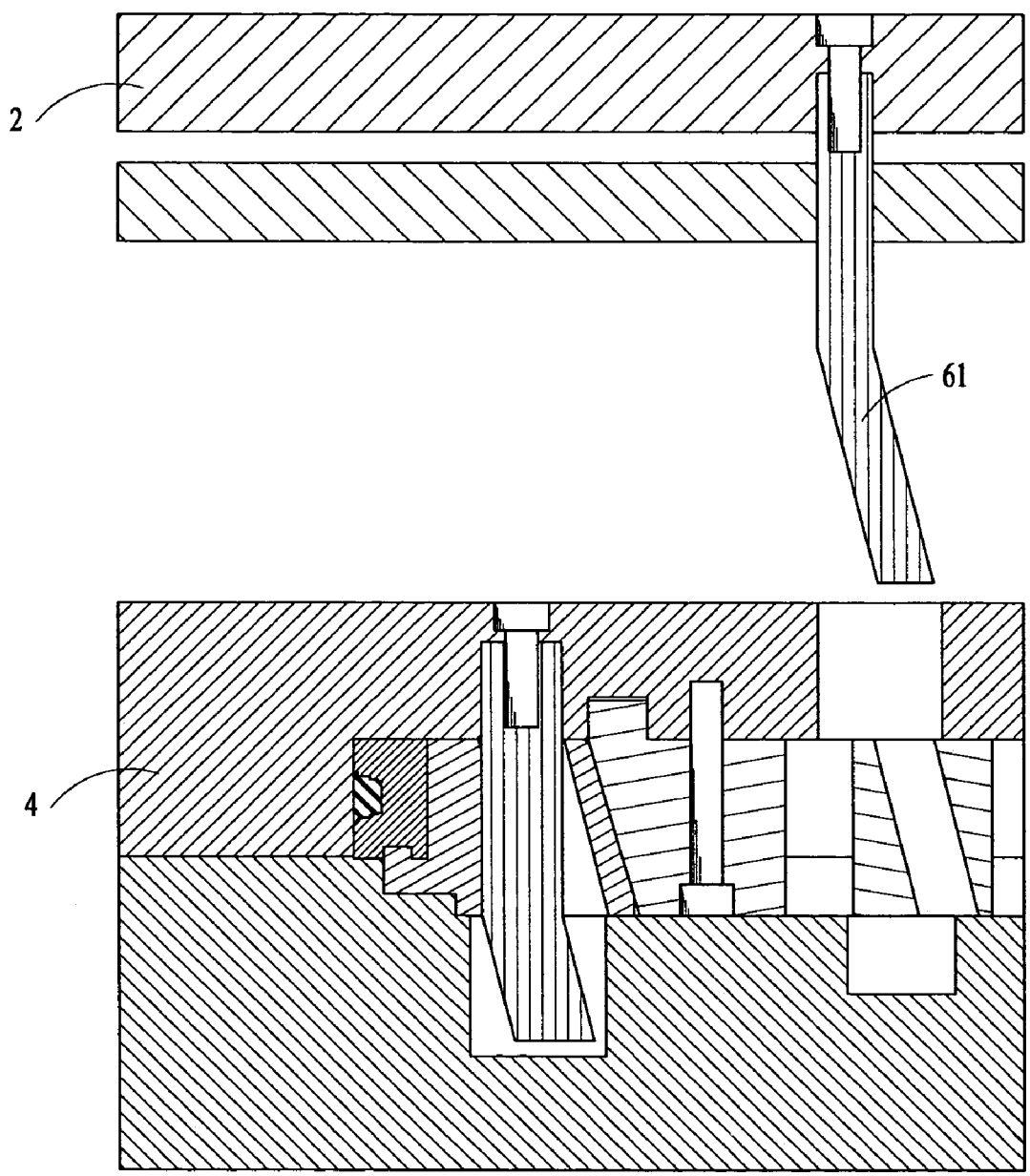
FIGS. 5A and 5B are sectional views of the preferred embodiment of the present invention which shows the mold assembly in a middle mold opening state.
Figure 5B:
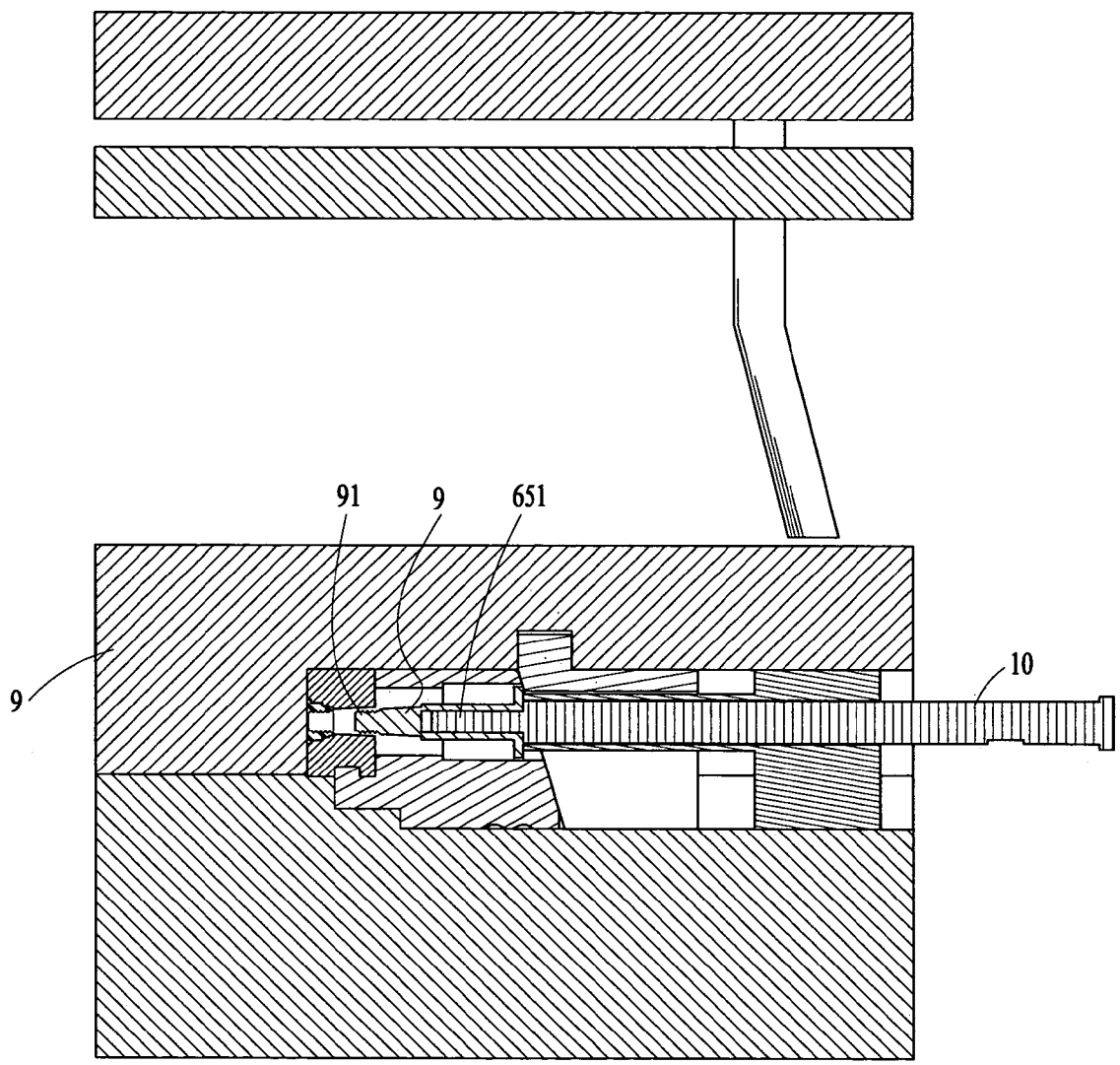

Please refer to FIG. 5A and FIG. 5B, the female mold 4 and the male mold 5 are moved downward together till the first inclined pin 61 is entirely come out of the female mold 4, then external drive means (not shown) drives the shaft 10 to rotate and in turn the threaded pole 9. The external thread 91 of the threaded pole 9 is thus unscrewed from the molded article.

Figure 6A:
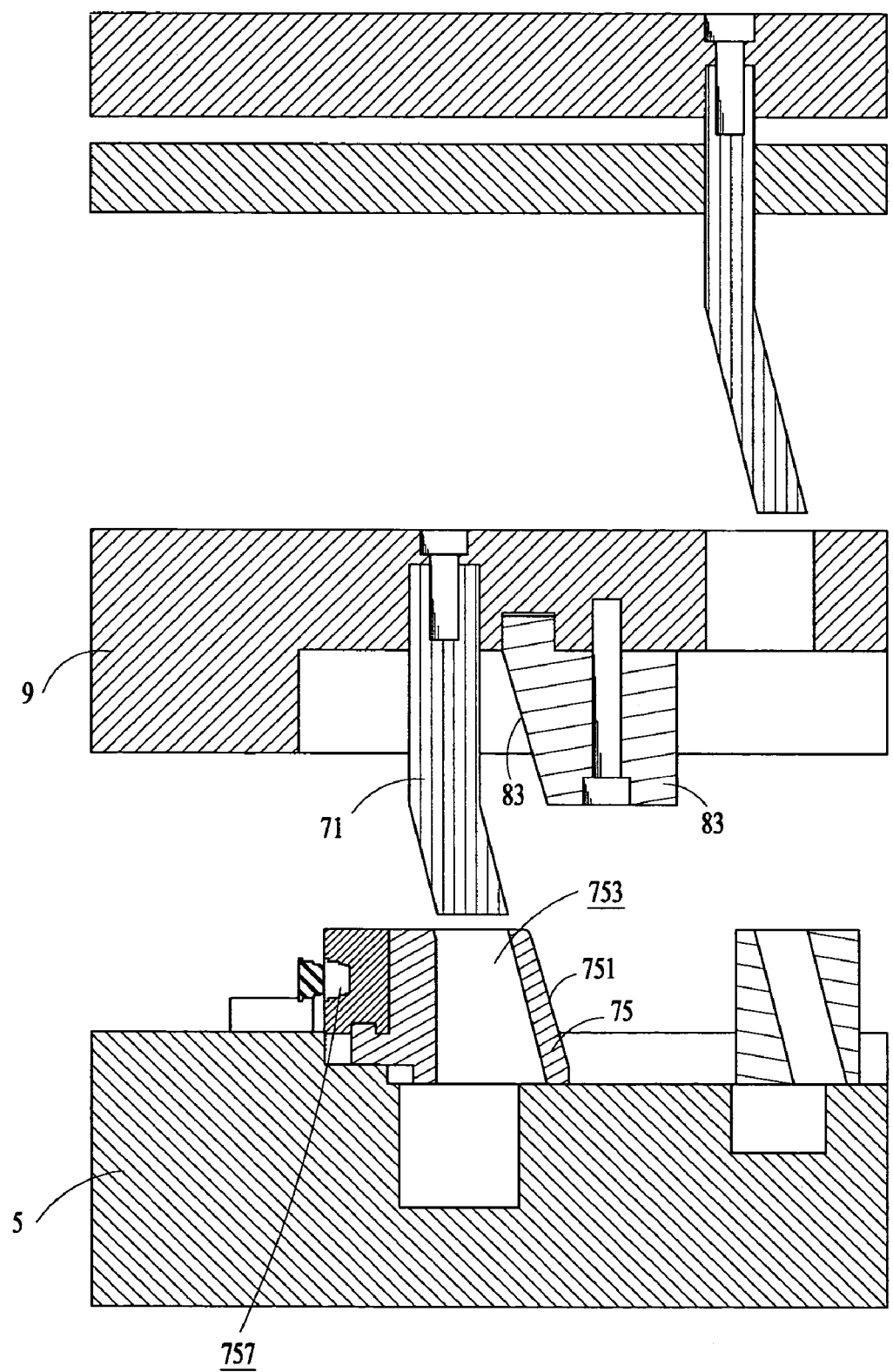
FIGS. 6A and 6B are sectional views of the preferred embodiment of the present invention which shows the mold assembly in a complete mold opening state.
Figure 6B:
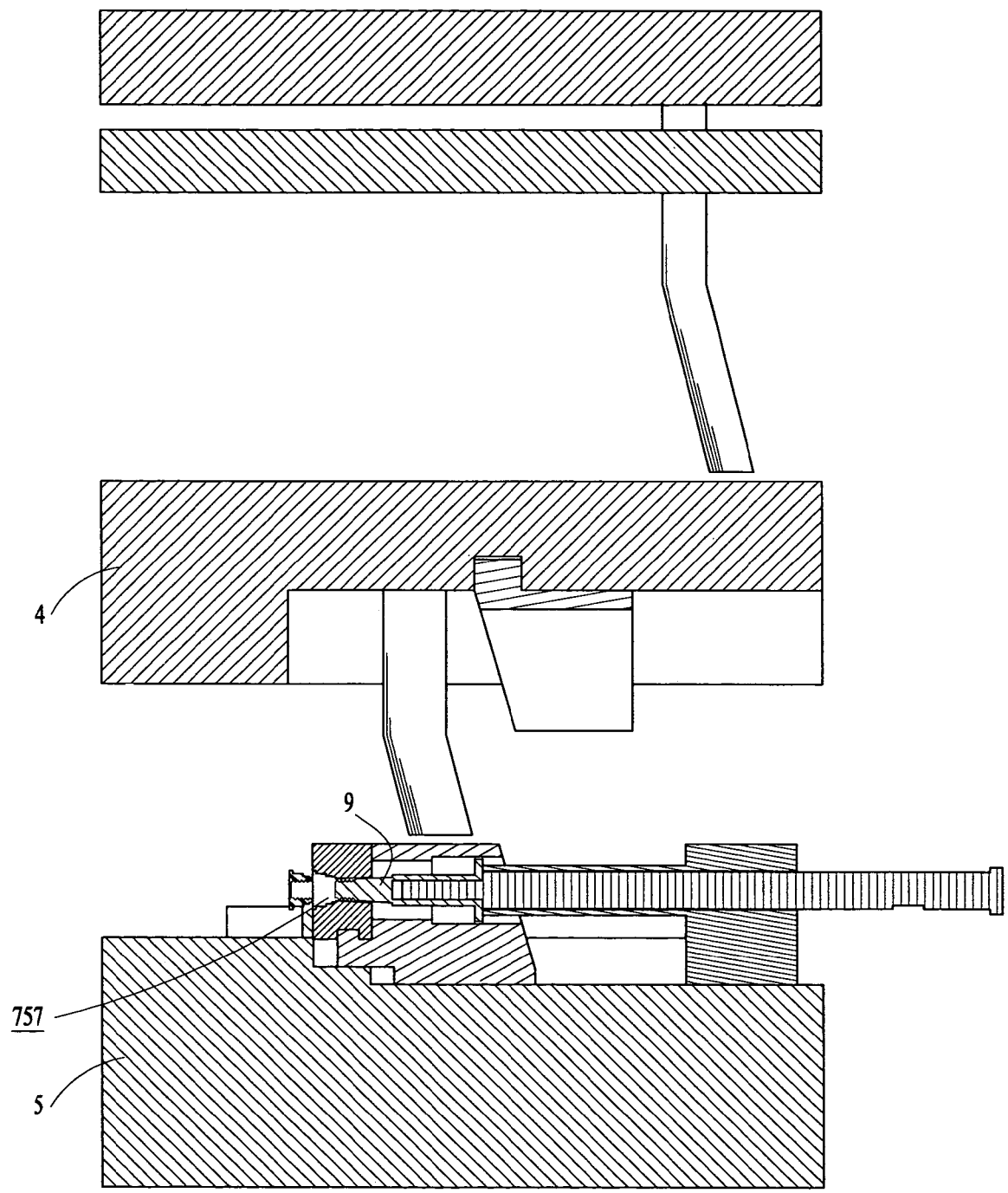
Figure 7:
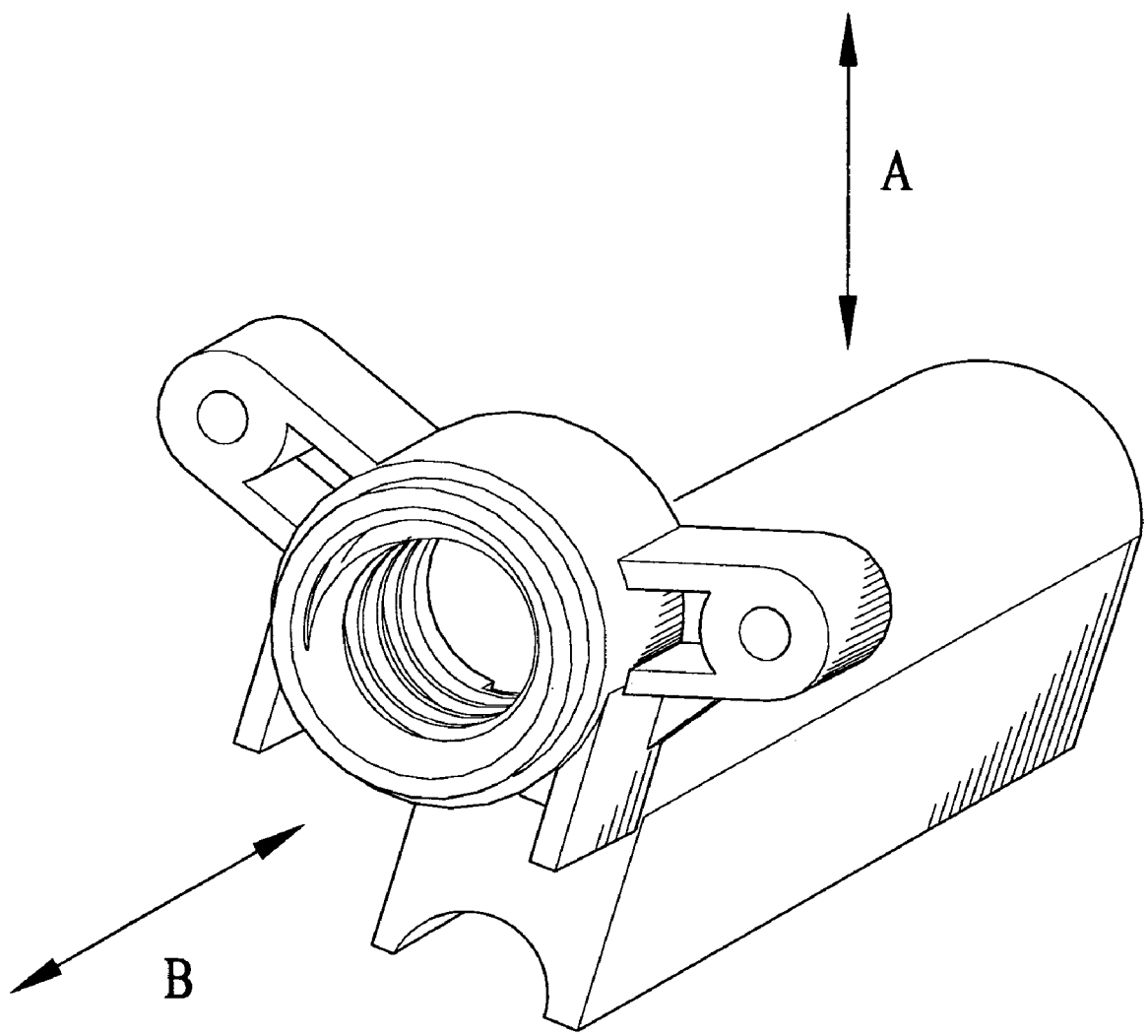
FIG. 7 shows a molded article which has internal thread and a complicated shape.

Please refer to FIG. 6A and FIG. 6B, after the threaded pole 9 departs entirely from the molded article, the male mold 5 begins to move downward and departs from the female mold 4, and the second slider 75 departs from the following block 8 as well. A space is formed between the inclined surface 751 of the second slider 75 and the inclined stopper 83 of the following block 8. The second inclined pin 71 pushes the second slider 75 backward so that the second slider 75 departs completely from the molded article. Then the molded article can be ejected from the male mold 5 easily.

What is claimed is:

1. A mold assembly for forming a plastic article having a complicated shape comprising:
   a fixed plate;
   a female mold placed under the fixed plate, the female mold defining a second hole therethrough;
   a male mold placed under the female mold, the male mold defining a slot in a top surface thereof;
   a first sliding mechanism comprising a first slider and a first inclined pin, wherein the first slider is slidingly received in said slot and has a sleeve extending from one side thereof and an inclined leading aperture therethrough, a first shaft hole being provided through the first slider to be in communication with the sleeve, and wherein the first inclined pin is secured to said fixed plate and passes through said second hole and the inclined leading aperture, the first inclined pin being bent at a proper location to cooperates with said inclined leading aperture to push the first slider sliding along said slot;
   a second sliding mechanism comprising a second slider and a second inclined pin, wherein the second slider is slidingly received in said slot and has a trapezoid hole and a second shaft hole which is coaxial with the first shaft hole, the second slider being provided with an inclined surface at on one side thereof and a mold cavity in the other side thereof, the mold cavity being in communication with the second shaft hole, and wherein the second inclined pin is secured to the female mold and passes through the trapezoid hole, the second inclined pin being bent at a proper location to cooperate with the trapezoid hole to push the second slider sliding along said slot;
   a following block fixed to the female mold, the following block defining a receiving groove therein which is exposed to a bottom surface of the following block so as to receive the sleeve while closing the mold assembly, the following block providing an inclined stopper corresponding to the inclined surface of the second slider, in the mold assembly closing state, the inclined stopper of the following block withstanding the second slider, while opening the mold assembly, the following block being moved upward and the inclined stopper providing a space for the second slider sliding backward;
   a threaded pole having an external thread at one end and a flange at the other end, a receiving hole defined in the threaded pole extending along an axis of the threaded pole; and
   a shaft, one end of which is a transmitting part, and the other end of which connects external driving means, the shaft passing through the first shaft hole and the sleeve, and received in the second shaft hole, the transmitting part of the shaft being received in the receiving hole so as to drive the threaded pole rotating, in the mold assembly closing state, the external thread of the threaded pole extending into the mold cavity to form a plastic article molding cavity, and the sleeve of the first slider withstanding the flange of the threaded pole, while opening the mold assembly, the first slider being moved backward to provide a space between the sleeve and the flange for the threaded pole unscrewing from the molded article.

2. A mold assembly for forming a plastic article having a complicated shape as claimed in claim 1, wherein further comprises a stripping plate placed under said fixed plate.

* * * * *